United States Patent [19]

Mihailidi et al.

[11] Patent Number: 5,647,029

[45] Date of Patent: Jul. 8, 1997

[54] TRAVELING WAVE QUANTUM WELL WAVEGUIDE MODULATORS USING VELOCITY MATCHING FOR IMPROVED FREQUENCY PERFORMANCE

[75] Inventors: Margarita M. Mihailidi, New York, N.Y.; Jane Elisa Zucker, Aberdeen, N.J.

[73] Assignee: Lucent Technologies Inc., Murray Hill, N.J.

[21] Appl. No.: 563,189

[22] Filed: Nov. 27, 1995

[51] Int. Cl.$^6$ .................................................. G02F 1/035
[52] U.S. Cl. .................................................................. 385/2
[58] Field of Search ............................... 385/1, 23, 14, 385/40; 359/46, 36, 251; 372/26, 28; 333/157; 250/208.2, 227.11

[56] References Cited

U.S. PATENT DOCUMENTS

| | | | |
|---|---|---|---|
| 4,525,687 | 6/1985 | Chemla et al. | 332/7.51 |
| 4,733,397 | 3/1988 | Gallagher et al. | 372/26 |
| 4,818,079 | 4/1989 | Maserjian | 350/354 |
| 4,928,076 | 5/1990 | Mourou et al. | 330/4.3 |
| 4,953,955 | 9/1990 | Maserjian | 350/354 |
| 5,091,981 | 2/1992 | Cunningham | 385/3 |
| 5,105,301 | 4/1992 | Campi | 359/245 |
| 5,138,480 | 8/1992 | Dolfi et al. | 359/251 |
| 5,153,687 | 10/1992 | Ishikawa et al. | 357/30 |
| 5,184,233 | 2/1993 | Lim et al. | 359/46 |
| 5,194,972 | 3/1993 | Lim et al. | 359/46 |
| 5,208,695 | 5/1993 | Dutta | 359/245 |
| 5,329,137 | 7/1994 | Taylor et al. | 257/21 |
| 5,339,369 | 8/1994 | Hopfer et al. | 385/2 |
| 5,355,422 | 10/1994 | Sullivan et al. | 385/1 |
| 5,359,449 | 10/1994 | Nishimoto et al. | 359/181 |
| 5,367,274 | 11/1994 | Thylén | 333/103 |
| 5,404,006 | 4/1995 | Schaffner et al. | 250/208.2 |
| 5,412,678 | 5/1995 | Treat et al. | 372/45 |
| 5,428,225 | 6/1995 | Silva et al. | 257/14 |

OTHER PUBLICATIONS

K. Wakita et al., "High Speed InGaAs/InAlAs Multiple Quantum Well Optical Modulators With Bandwidths in Excess of 40 GHz at 1.55 μm", CLEO '90, May 22, 1990, p. 70 and associated CTUC6 FIGS. 1-3.

J.E. Zucker et al., "Electro-optic Modulation in a Chopped Quantum-Well Electron Transfer Structure", Electronics Letters, vol. 30, No. 6, Mar. 17, 1994, pp. 518-520.

J.E. Zucker, "High-Speed Quantum-Well Interferometric Modulators For InP-Based Photonic Integrated Circuits", Microwave And Optical Technology Letters, vol. 6, No. 1, Jan. 1993, pp. 6-14.

J.E. Zucker et al., "Optical Waveguide Intensity Modulators Based on a Tunable Electron Density Multiple Quantum Well Structure", Applied Physics Letters, vol. 56, No. 20, May 14, 1990, pp. 1951-1953.

*Primary Examiner*—Akm E. Ullah

[57] ABSTRACT

An optoelectronic modulator modulates an optical signal in response to an electromagnetic signal. The optoelectronic modulator includes a waveguide for conveying the optical signal, where the waveguide has an associated width, core thickness, and waveguide-electrode separation, and includes a optical index of refraction with respect to the optical signal and a microwave index of refraction with respect to the electromagnetic signal; and where the microwave index of refraction substantially matches the optical index of refraction for velocity-matching the optical signal and the electromagnetic signal through the waveguide. The waveguide may be disposed on an n-type doped substrate, may include a quantum well region disposed on the substrate, and may have a predetermined width for providing the matching of refractive indices.

31 Claims, 10 Drawing Sheets

TRAVELING WAVE QUANTUM WELL WAVEGUIDE MODULATORS USING VELOCITY MATCHING FOR IMPROVED FREQUENCY PERFORMANCE

BACKGROUND INFORMATION

1. Technical Field

This disclosure relates to optoelectronic devices, and in particular to high speed optoelectronic modulators for high data rate optical communications.

2. Description of the Related Art

For high speed optical communications, optoelectronic modulators are increasingly being used in a wide variety of applications ranging from satellite-based phased array radar to signal processing in communications systems. High-speed optoelectronic modulators are key components in many systems including optical communications, analog microwave optical links, and optical time division demultiplexing. In particular, the lithium niobate based modulator has received wide commercial acceptance for its efficient coupling to optical fibers and its low insertion loss. In some applications, III-V based modulators have been used as a substitute for lithium niobate based modulators since such III-V based modulators are well suited for integration with electronic and photonic devices, and may be fabricated to be more compact than their lithium niobate counterparts.

Typically, travelling wave III-V based modulators are fabricated in two configurations, namely, a) a microstrip configuration where a modulating electric field is applied perpendicular to the substrate plane, to bottom and top electrodes, and b) a coplanar configuration where a modulating electric field is applied between two electrodes that are placed side by side, separated by a gap.

Semiconductor travelling wave modulators generally require large drive voltages, since the implementation of relatively low driving voltages increases the device length. Increased length hampers the attainment of operating frequencies corresponding to millimeter wavelengths due to velocity mismatches caused by the microwave and optical refractive index difference.

Other optoelectronic modulators known in the art, such as GaAs-AlGaAs based modulators disclosed in R. Walker, "High-Speed III-V Semiconductor Intensity Modulators", IEEE JOURNAL OF QUANTUM ELECTRONICS, VOL. 27, NO. 3, March 1991, pp. 654–667; may employ p-i-n structures that may exhibit relatively large optical propagation losses, may require driving voltages of 8 V or more, and may be relatively difficult to fabricate, such as by segmented etching or isolation.

SUMMARY

It is recognized herein that the low-voltage advantage of semiconductor quantum wells may be combined with a velocity-matched traveling wave structure to produce a low-power-consumption optoelectronic modulator with the capability to attain operating frequencies corresponding to millimeter wavelengths.

The invention, as disclosed herein, includes an n-i-n structure with lower optical propagation loss than in known p-i-n structures. The invention also includes quantum well structures that allow much lower voltage operation, such as about 2 V operating voltages, as opposed to, for example, 8 V used in known modulators. The invention also includes a semiconductor structure, in which the microwave index $n_\mu$ and the optical index $n_{OPT}$ are substantially closer in value, and therefore are relatively easier to match via the design of the structure, as opposed to known lithium niobate based devices.

The invention also does not require segmented etching or isolation as in known devices, and therefore are relatively easy to fabricate. The invention may also attain improved performance using either doped substrates or semi-insulating substrates. In hybrid coplanar/microstrip configurations, the invention permits a lowering of the microwave index relative to conventional quantum well waveguide modulators; for example, 50 Ω impedance matching may be achieved using such configurations. The microwave and optical indices of refraction may thus be closer. The hybrid coplanar/microstrip configuration also use perpendicular fields for the quantum wells that may be employed for optimal electro-optic and electro-refractive effects.

Such configurations also have good overlap of optical and microwave fields relative to ordinary coplanar configurations. In addition, such hybrid coplanar/microstrip configurations also present no tradeoff between low drive voltages and high bandwidths, and so may attain both high bandwidths and low drive voltages, as opposed to known lumped modulators that attain high bandwidths by reducing the overall length but causing the drive voltages to increase, and as opposed to known travelling wave modulators that have small drive voltage with long overall length.

An optoelectronic modulator incorporating the above inventive features is disclosed for modulating an optical signal in response to an electromagnetic signal. The optoelectronic modulator includes a waveguide for conveying the optical signal, where the waveguide has an associated optical index of refraction with respect to the optical signal and a microwave index of refraction with respect to the electromagnetic signal; and where the microwave index of refraction substantially matches the optical index of refraction for velocity-matching the optical signal and the electromagnetic signal through the waveguide. The structure may be disposed on an n-type doped substrate or a thin n-type layer as a semi-insulating substrate. The waveguide may include a quantum well region disposed on the substrate, and may have predetermined dimensions of waveguide, electrodes, and waveguide-electrode spacing.

BRIEF DESCRIPTION OF THE DRAWINGS

The features of the disclosed optoelectronic modulator will become more readily apparent and may be better understood by referring to the following detailed description of an illustrative embodiment of the present invention, taken in conjunction with the accompanying drawings, where.

3

Figure 6:
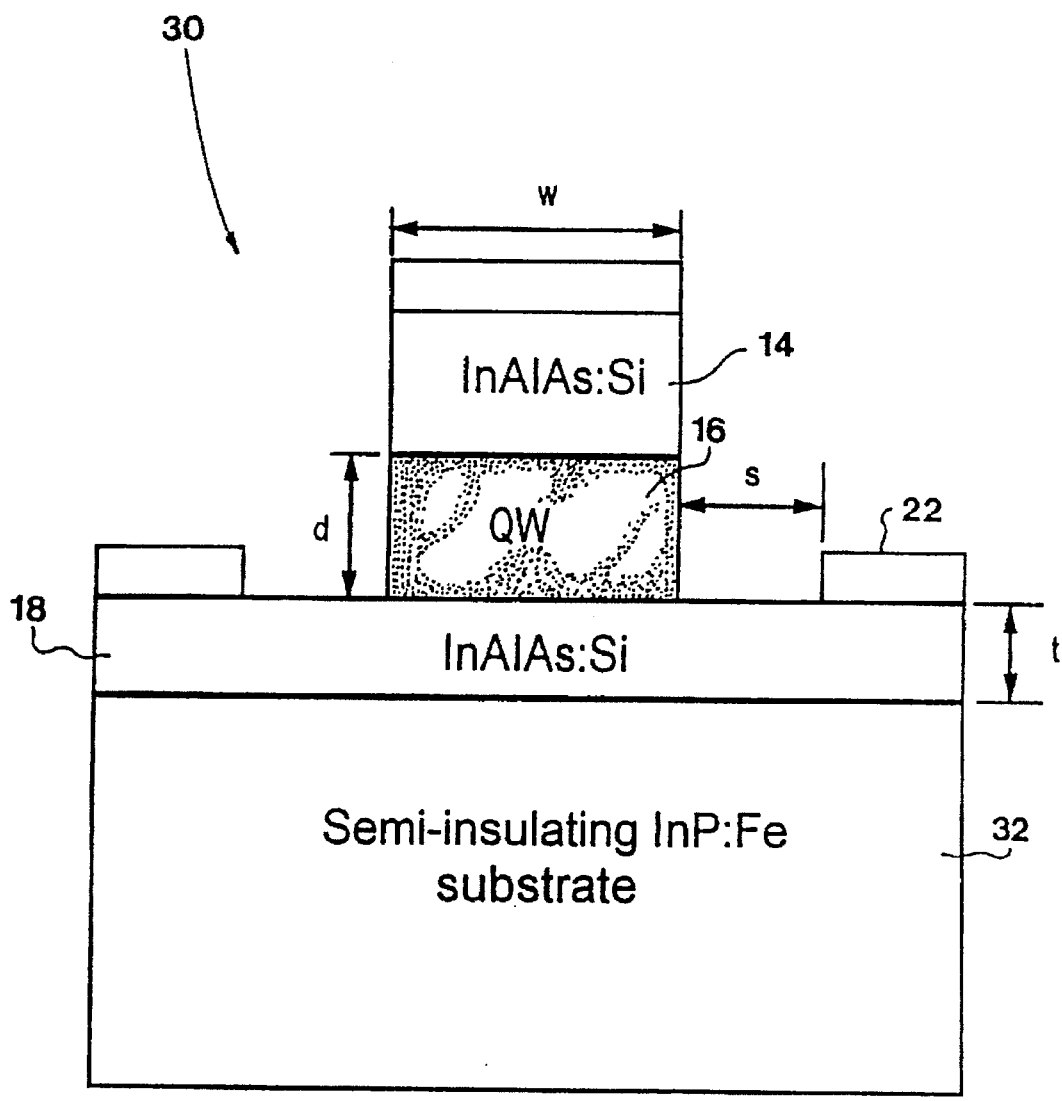
FIG. 6 is a cross-sectional view of an alternative embodiment of the disclosed optoelectronic modulator.
Figure 8:
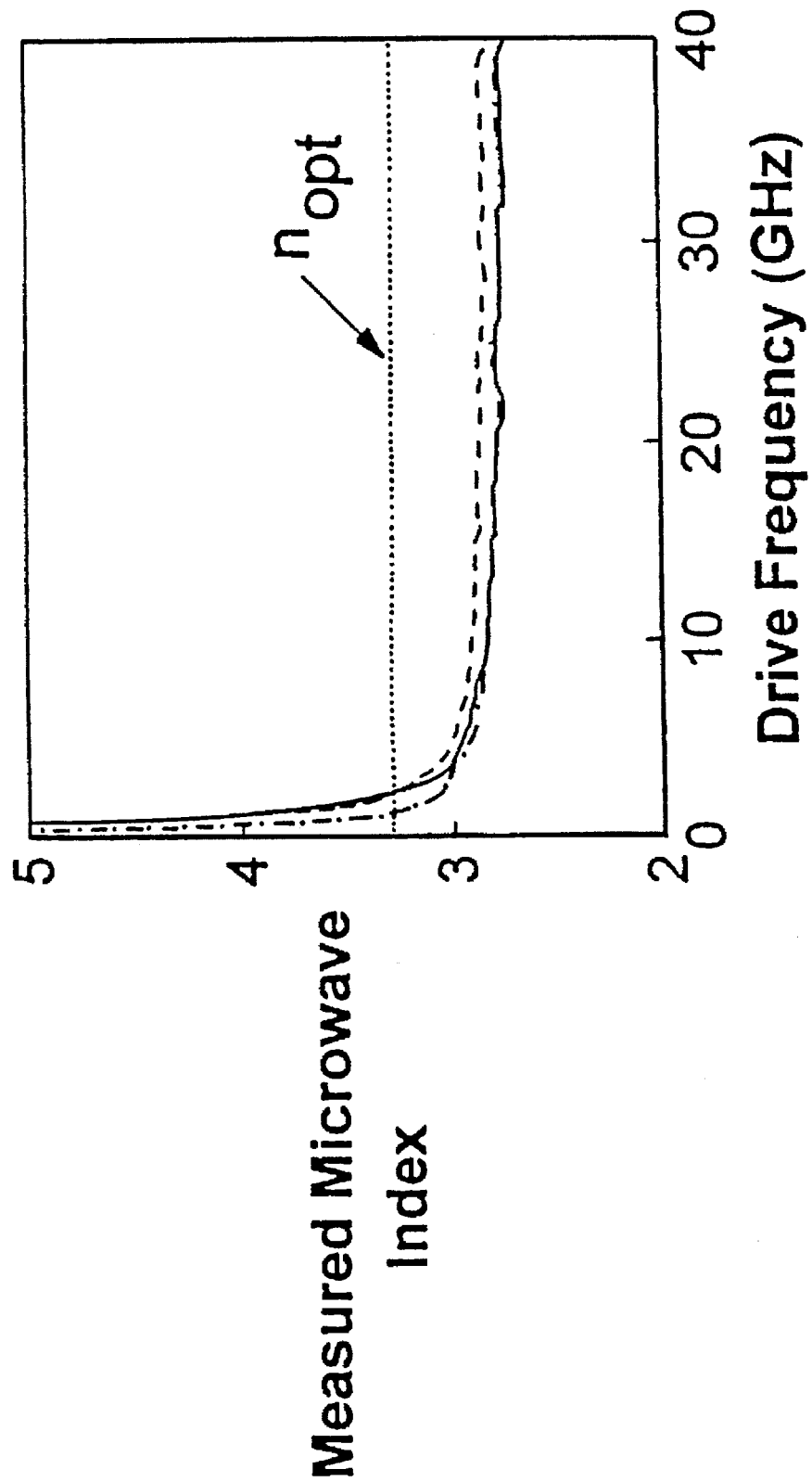
Figure 9:
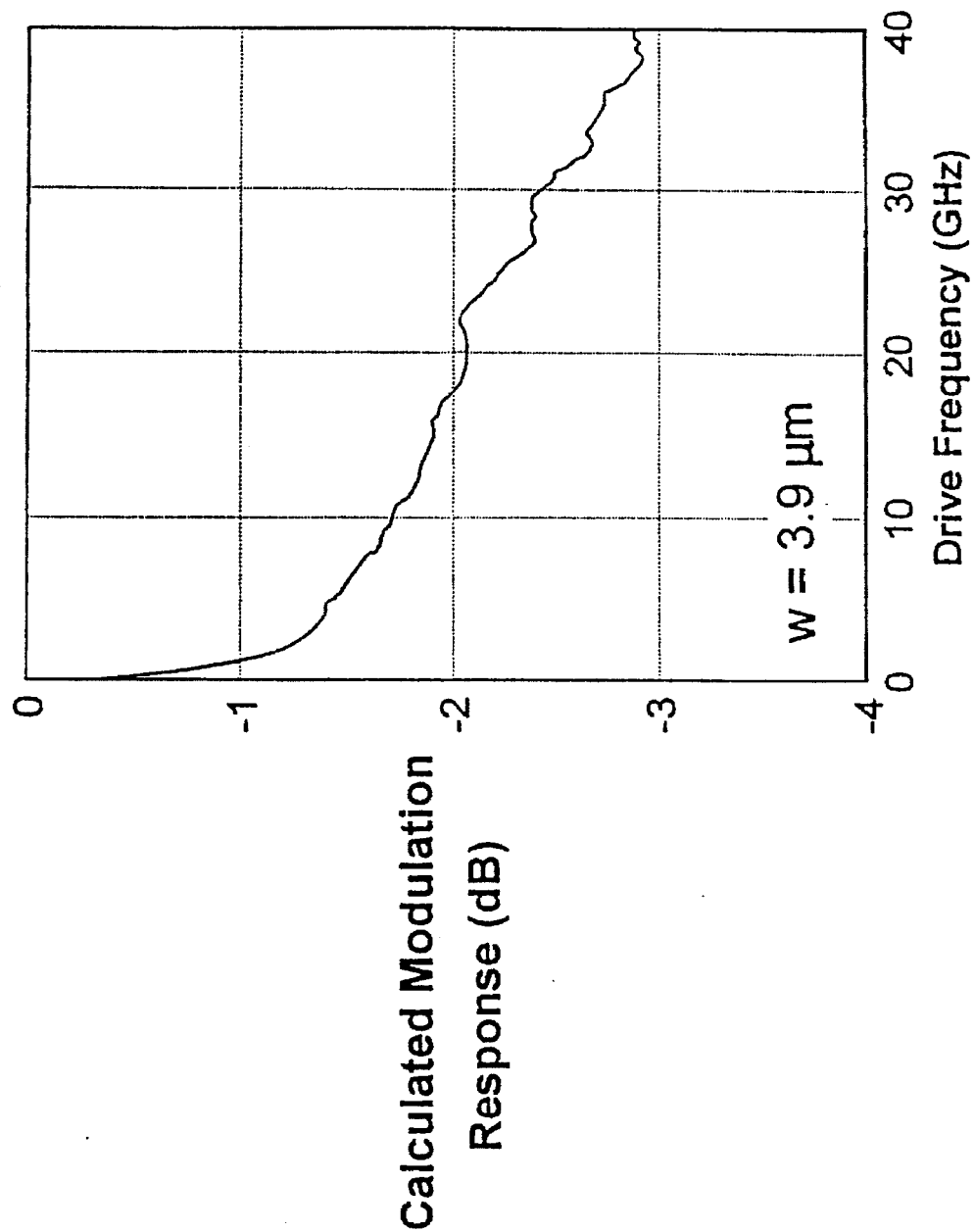
Figure 10:
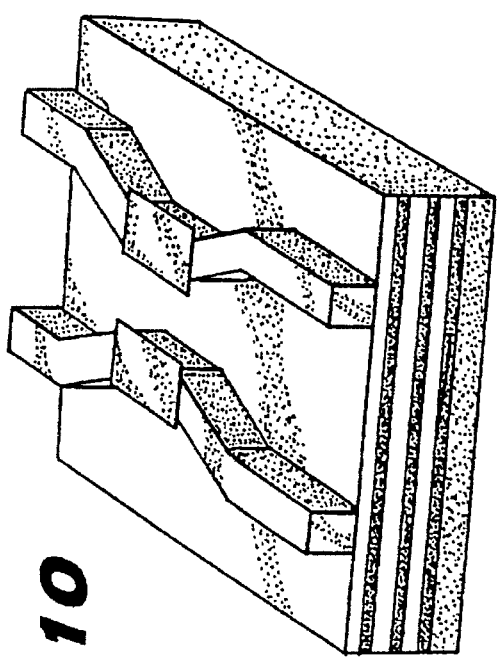
Figure 11:
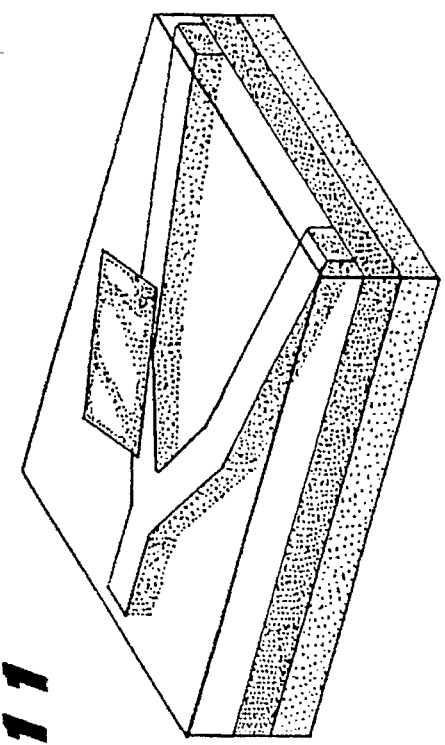

FIG. 8 is a graph indicating a decrease in the microwave index with increasing frequency;

FIG. 9 is a graph of the modulation response of the optoelectronic modulator of FIG. 6;

FIG. 10 is a perspective view of an optoelectronic device;

FIG. 11 is a perspective view of another optoelectronic device; and

Figure 12:
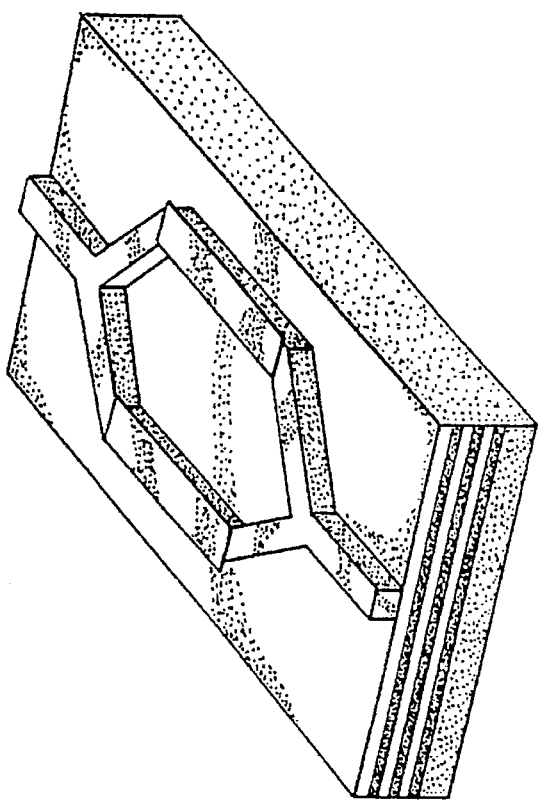

FIG. 12 is a perspective view of an optoelectronic modulator.

DESCRIPTION OF THE PREFERRED EMBODIMENTS

Figure 1:
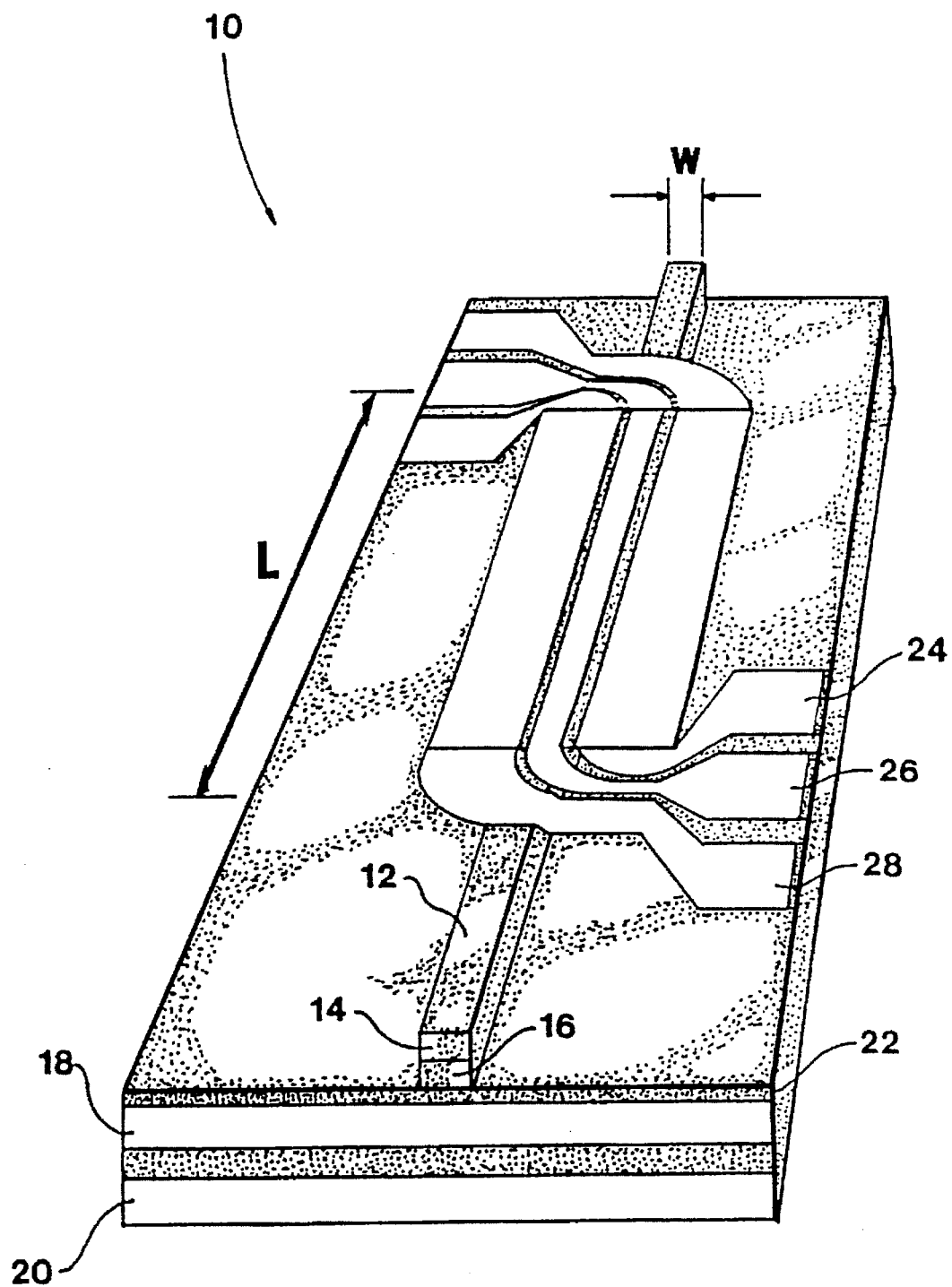
FIG. 1 illustrates a hybrid coplanar-microstrip configuration with a straight rib waveguide implementing the disclosed optoelectronic modulator.

Referring now in specific detail to the drawings, with like reference numerals identifying similar or identical elements, as shown in FIG. 1, the present disclosure describes optoelectronic modulator 10 having a hybrid microstrip-coplanar waveguide configuration and including InGaAs/InGaAlAs Barrier Reservoir and Quantum Well Electron Transfer (BRAQWET) material. The dimensions of optoelectronic modulator 10 are determined such that modulation bandwidths of up to and beyond about 40 GHz may be achieved.

As shown in FIG. 1, optoelectronic modulator 10 has a straight rib waveguide configuration to operate as a traveling wave structure for modulating an input optical signal in response to an input electromagnetic signal, such as microwaves provided or generated at an input region, such as electrodes. This straight waveguide may be a section of a larger switch or an interferometric modulator structure.

In one embodiment, optoelectronic modulator 10 includes rib 12 having a width w, a modulation region of length 1, upper n-type InAlAs cladding layer 14, and quantum well region 16 having a BRAQWET composition and a thickness d of about 0.768 μm. Rib 12 is positioned upon lower n-type InAlAs cladding layer 18 and substrate 20. This configuration may be implemented by wet-etching techniques known in the art to a depth of about 1.3 μm to be just beyond quantum well region 16 and into lower cladding layer 18. In other embodiments, the quantum well region (core) can be BRAQWETs or some other quantum well heterostructure. Cladding could be InP, or any material with an optical index less than the optical index of the quantum well core.

Layer 22 of polyimide, such as type PI2560 available from DUPONT having a permittivity $\epsilon_r$ of about 3.4, is deposited on lower cladding layer 18. Vias are opened for depositing the top and side electrodes; for example, by applying evaporated Cr having a thickness of about 100 Å and evaporated Au having a thickness of about 9000 Å, for fabricating ground pads 24, 26 and signal pad 28 for applying the input electromagnetic signal to modulate the input optical signals.

Figure 2:
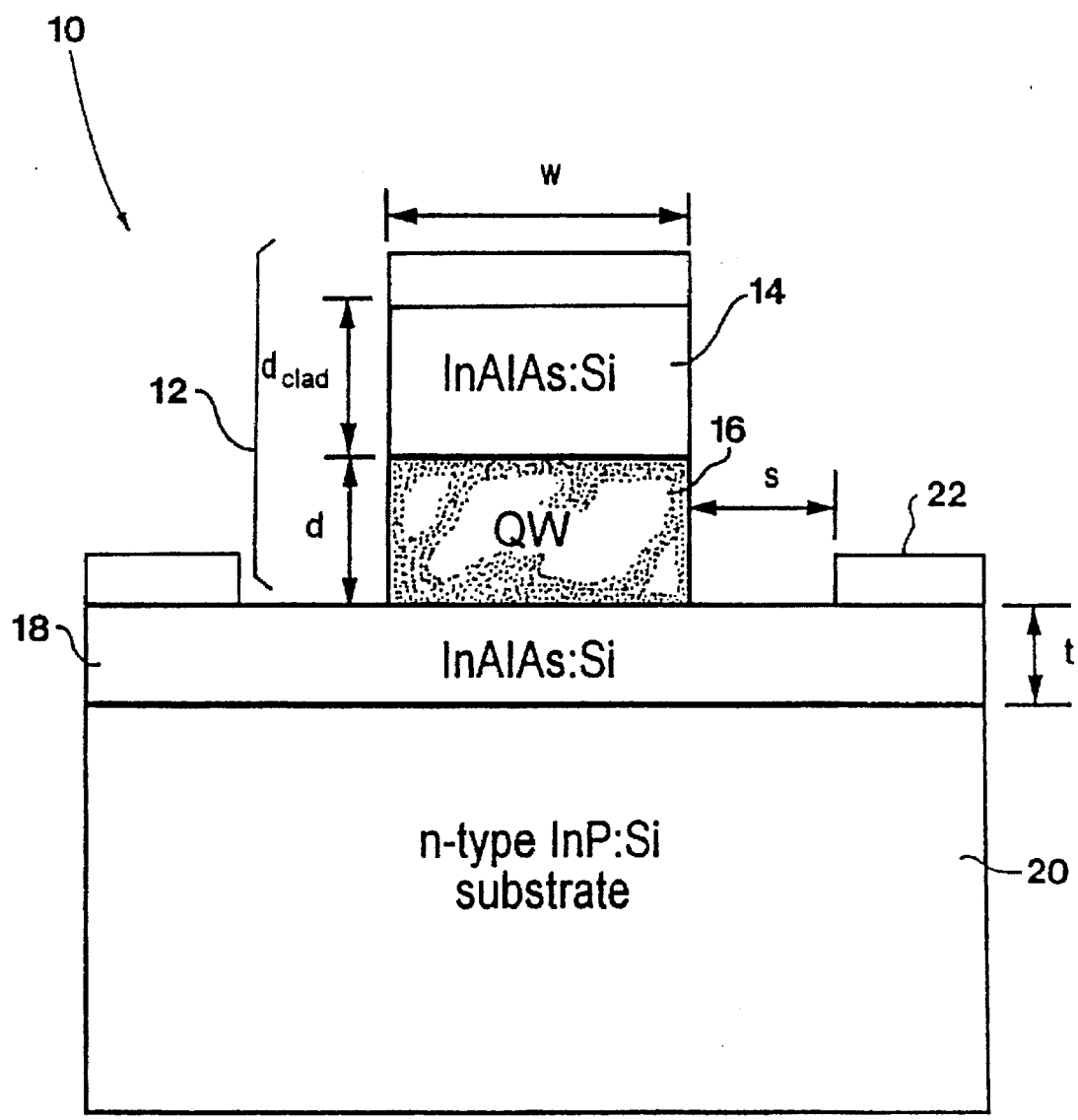
FIG. 2 is a cross-sectional view of the disclosed optoelectronic modulator of FIG. 1.

FIG. 2 is a cross-sectional view of optoelectronic modulator 10 of FIG. 1, which may be used to attain such high bandwidths with relatively low drive voltages. Using pads 24-28, operating voltage is applied between substrate 20 and upper cladding layer 14, which may be composed of n-type InAlAs. In this configuration, the electrical field generated by the applied voltage is concentrated across quantum well region 16.

In one embodiment, substrate 20 may be composed of InP:Si material, which may have an n-type doped composition to produce a frequency dependence of the microwave index $n_\mu$.

The use of quantum well region 16 concentrates the received optical signals generally along a central axis of rib 12, and quantum well region 16 changes the electroabsorption of the waveguide.

4

Quantum well region 16 includes about 12 BRAQWET periods or layers, with each BRAQWET period having, for example, a 200 Å InGaAlAs reservoir with a 1.06 eV bandgap and being Si-doped $3.0 \times 10^{18}$ cm$^{-3}$; an undoped 120 Å A InGaAlAs spacer, a 70 Å InGaAs quantum well, and a 250 Å InAlAs barrier including a 70 Å undoped layer, a 100 Å Be-doped $2.0 \times 10^{18}$ cm$^{-3}$ layer and a 80 Å undoped layer. Upper and lower InAlAs:Si cladding layers 14, 18 have a thickness on the order of about 4100 Å and 2500 Å, respectively. The BRAQWET composition provides for generally lower applied operating voltages to modulate the optical signals.

In optoelectronic modulator 10, all epitaxial layers may be grown by solid-source molecular beam epitaxy. One advantage of this hybrid coplanar-microstrip geometry is the relatively large overlap between optical and microwave fields.

S-parameters may be used to determine the microwave refractive index $n_{s2}$, the microwave loss $\alpha_\mu$, and the characteristic impedance of optoelectronic modulator 10 which, in the straight rib waveguide configuration, may be modelled as a transmission line. It can be shown that parameters $S_{11}$ and $S_{21}$ associated with a transmission line may be measured as a two port network, and are given by:

$$S_{11} = \frac{i(Z^2 - 1)\sin(\omega \cdot \tau)}{2Z\cos(\omega \cdot \tau) + i(Z^2 + 1)\sin(\omega \cdot \tau)}$$

$$S_{12} = \frac{2Z}{2Z\cos(\omega \cdot \tau) + i(Z^2 + 1)\sin(\omega \cdot \tau)}$$

with the normalized impedance Z defined as $Z=Z_0/Z_{REF}$, where $Z_0$ is the characteristic impedance of the transmission line, $Z_{REF}$ is a reference impedance, and the angular frequency $\omega$ and the complex time delay $\tau$ are parameters associated with transmission line. The operating frequency f of optoelectronic modulator 10 equal $\omega/2\pi$, and may attain a bandwidth up to and beyond 40 GHz, as described below.

A propagation parameter is given as $\Lambda(w)=1/\tau(\omega)$, where 1 is the waveguide length of the modulation region. The propagation parameter is not constant with length because of pad parasitic effects. Therefore, linear plots and fits may be made to determine the complex delay as a function of length at each frequency point, so the parasitic delay $\tau_{PAD}(\omega)$ may be obtained from plotting $\tau(\omega,1)$. The microwave refractive index $n_\mu$ and microwave loss $\alpha_\mu$ are determined from the corrected propagation parameter given as:

$$\Lambda_{CORR}(\omega) = \frac{l}{[\tau(\omega) - \tau_{PAD}(\omega)]}$$

Figure 3:
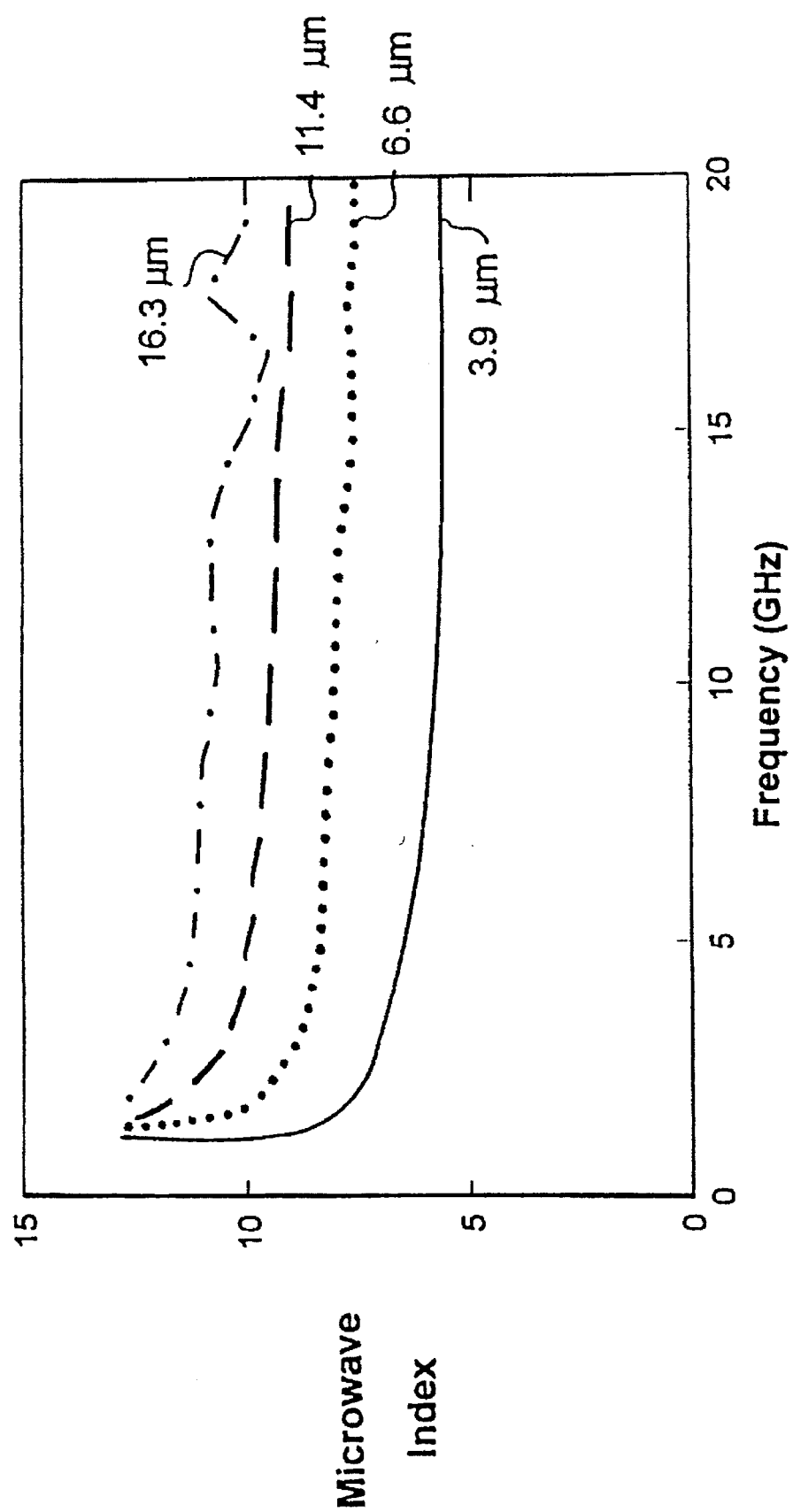
FIG. 3 is a graph indicating a decrease in the microwave index with increasing frequency.

As shown in FIG. 3 with reference to the configuration in FIG. 2, i.e. having a doped substrate, the resulting values of $n_\mu$ vs. operating frequency f are plotted for waveguide widths w=3.9 μm, 6.6 μm, 11.4 μm, and 16.3 μm, respectively, where the length 1 of the waveguide is about 8 mm. The plots may be derived from the corrected propagation parameter $\Lambda_{CORR}$ that are determined from measured S-parameters and from the extraction of pad parasitic values. FIG. 3 indicates that the microwave index $n_\mu$ generally decreases with waveguide width w for the configuration in FIG. 2 having a doped substrate.

Figure 4:
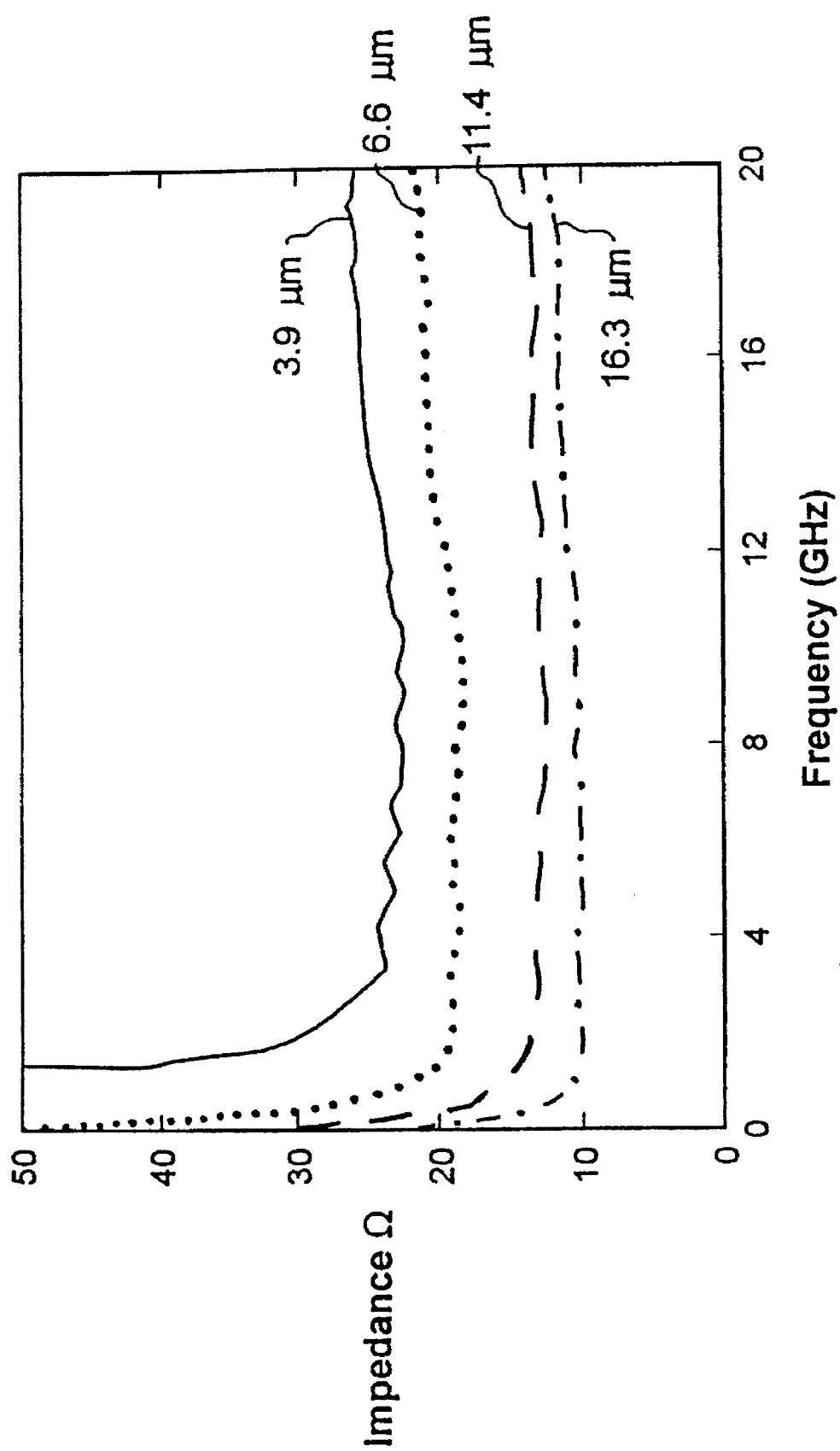
FIG. 4 is a graph of a characteristic impedance of the disclosed optoelectronic modulator of FIG. 1.

FIG. 4 illustrates the characteristic impedance Z as a function of the operating frequency f for w=3.9 μm, 6.6 μm, 11.4 μm, and 16.3 μm, obtained via S-parameter transformations for the configuration in FIG. 2 having a doped substrate. For overall performance, optoelectronic modulator 10 having n-type substrate 20 is to have impedance matching substantially near 25 Ω. As shown in FIG. 4, for smaller w, optoelectronic modulator 10 having widths less than about 3.9 µm attains both a better impedance matching to 25 Ω as well as enhanced velocity-matching as $n_\mu$ approaches $no_{OPT}=3.3$. The reduction of $n_\mu$ with decreasing w is also related to the decrease in capacitance, C, of the waveguide since $n_\mu=(LC/\mu_0\epsilon_0)$ and C∝w. It may be determined that, as w decreases from 16.3 µm to 2.5 m, the capacitance C changes from 1.31 pF/mm to 0.19 pF/mm. In addition, for the configuration in FIG. 2 having a doped substrate, the inductance L of the waveguide decreases as the width w decreases because the field distribution is forced into greater overlap with the electrodes.

Figure 5:
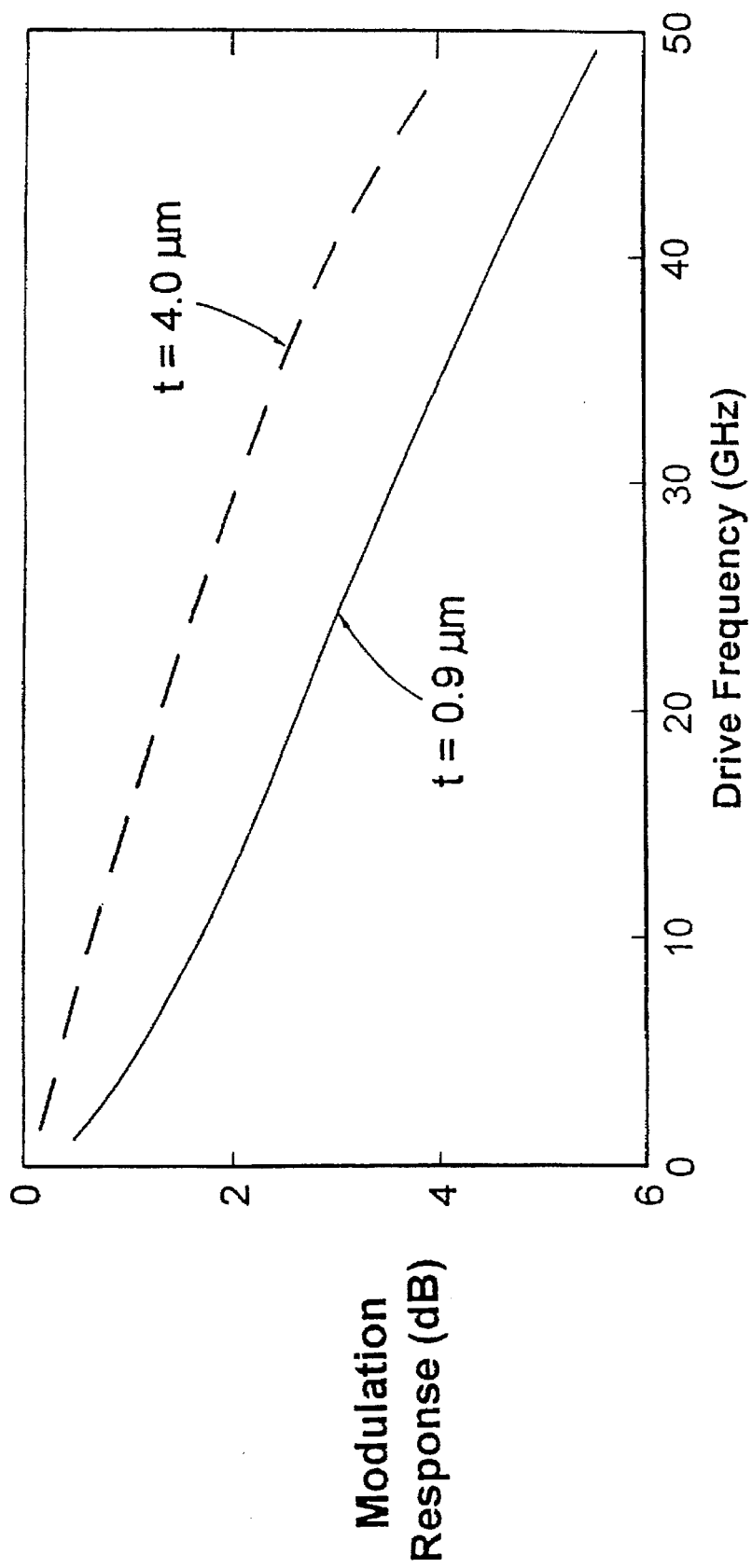
FIG. 5 is a graph of the modulation response of the optoelectronic modulator of FIG. 1.

Accordingly, enhanced impedance and velocity-matching may be obtained for optoelectronic modulators such as shown in FIGS. 1–2 that are configured as relatively narrow waveguides. Using the value for microwave loss obtained from the S-parameters, one may obtain $\alpha_\mu=7.3$ dBcm$^{-1}$GHz$^{-½}$ for w=3.9 µm, that may be used to determine the modulation bandwidth of optoelectronic modulator 10. An example of the optoelectronic modulation response for optoelectronic modulator 10 is shown in FIG. 5 for widths w=2.5 µm and l=1.5 mm. The 3 dB bandwidth is $V_{3\,dB}=30$ GHz for thickness t=0.9 µm of the gold electrode pad on lower cladding layer 18. With thicker electrode pads, an even higher bandwidth may be attained. The skin depth δ of gold is δ=0.92 µm at 10 GHz, so for t~4 δ (i.e. t~4.0 µm) and for $\alpha_\mu=2.5$ dB cm$^{-1}$GHz$^{-½}$, then $V_{3\,dB}=42$ GHz.

Optoelectronic modulators having the configuration shown in FIGS. 1–2 with a relatively narrow rib waveguide are thus capable of attaining optoelectronic modulation bandwidths in excess of 40 GHz. In addition, an optoelectronic modulator having a straight rib waveguide configuration as in FIG. 1 generally has a greater bandwidth than the bandwidth of a lumped modulator of the same length, which is about 12 GHz.

Alternatively, different substrates may be used to change and/or eliminate the frequency dependency of the microwave index $n_\mu$ due to skin depth effects. For example, optoelectronic modulator 10 shown in FIG. 1 may have alternative structure 30 as shown in FIG. 6 including semi-insulating substrate 32, which may be composed of InP:Fe. Optoelectronic modulator structure 30 of FIG. 6 may be dimensioned and configured, as described above, to have a coplanar-microstrip quantum well waveguide configuration such as shown in FIG. 1 in which semi-insulating substrate 32 effectively eliminates the frequency dependence of the microwave index due to skin depth effects and to reduce the microwave index $n_\mu$ to be about 2.9, resulting in a 3 dB modulation bandwidth of about 40 GHz. Alternatively, different cladding and quantum core structures may be used (e.g. InP cladding instead of AuGaAlAs, and another quantum well heterostructure instead of BRAQWETs).

Figure 7:
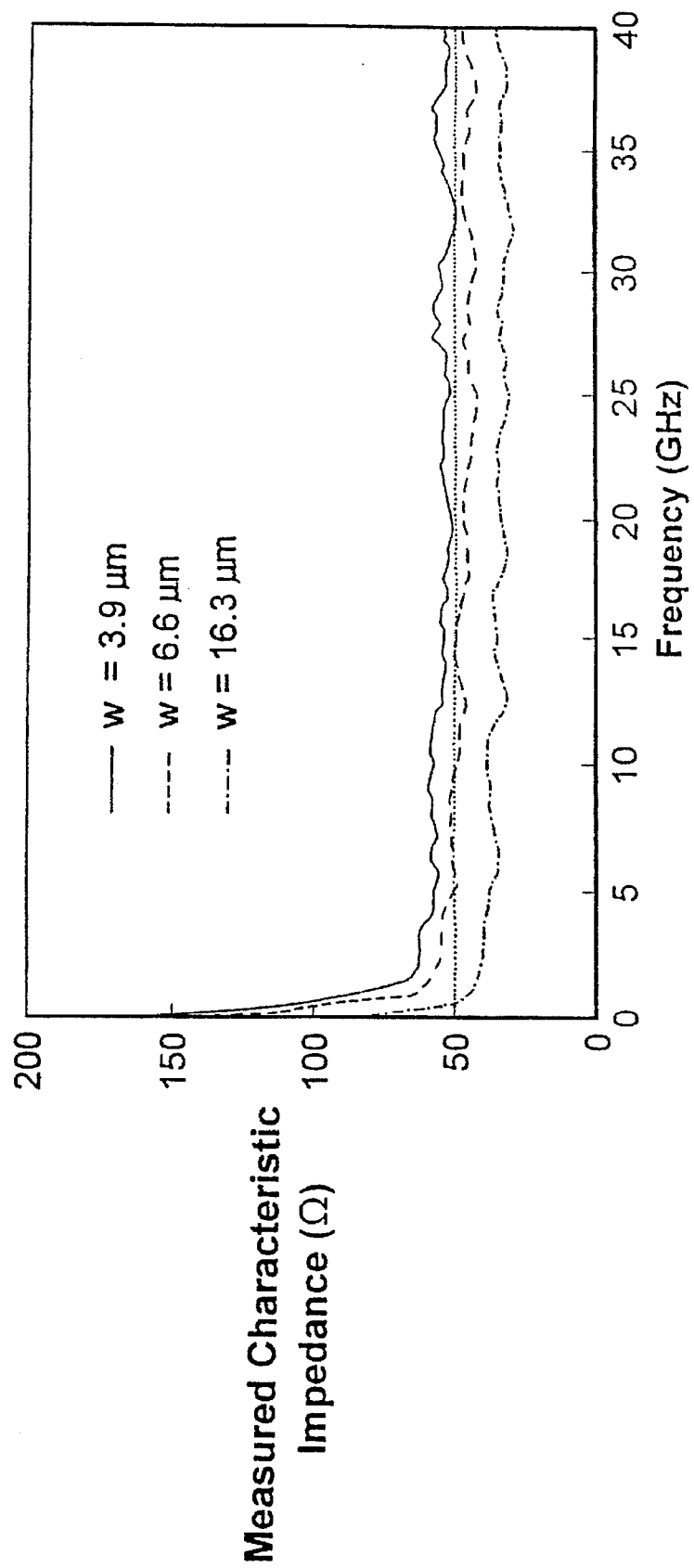
FIG. 7 is a graph of a characteristic impedance of the disclosed optoelectronic modulator of FIG. 6.

A graph of the measured characteristic impedance of optoelectronic modulator structure 30 is shown in FIG. 7 for waveguide widths w=3.9 µm, 6.6 µm, and 16.3 µm. For overall performance, optoelectronic modulator 30 having semi-insulating substrate 32 is to have impedance matching substantially near 50 Ω. For w=3.9 µm, a desired impedance of 50 Ω may thus be attained for optoelectronic modulator 30.

As shown in FIG. 8, a graph of the microwave index vs. frequency illustrates that the microwave index $n_\mu$ is a function of the frequency for different waveguide widths w. The microwave index $n_\mu$ of about 2.9 is achieved, which is substantially close to the optical index $no_{OPT}=3.3$ of the waveguide of the optoelectronic modulator 30, and the microwave index $n_\mu$ is substantially independent of the waveguide width w. With near-velocity matching, the electro-optic bandwidth may then be determined by the magnitude of the microwave loss.

Accordingly, enhanced impedance and velocity-matching may be obtained for optoelectronic modulators such as shown in FIG. 6 that are configured as relatively narrow waveguides.

For optoelectronic modulator 30 having a waveguide width w of about 3.9µm, the attenuation $\alpha_\mu$ is measured to be about 1.9 dB cm$^{-1}$GHz$^{-½}$, which provides a significant improvement in the electro-optic bandwidth. As shown in FIG. 9, for optoelectronic modulator 30 having a waveguide width w of about 3.9 µm, and a length l of about 1.5 mm, the electro-optic bandwidth at about 3 dB is about 40 GHz.

Such device lengths and widths using drive voltages less than about 4 V have greater than 20 dB extinction with a 40 GHz 3 dB bandwidth. For other waveguide widths of about 16.3 µm, 3 dB bandwidths greater than about 80 GHz may also be attained.

It is understood that other devices may be provided including the disclosed optoelectronic modulators described above as at least a portion of the devices. For example, the disclosed optoelectronic modulators having matching microwave and optical indices of refraction may be configured as a part of a switch such as the optoelectronic coupler shown in FIG. 10, or the Y-branch switch shown in FIG. 11. In addition, the disclosed optoelectronic modulators may be configured as part of a modulator structure such as the modulator shown in FIG. 12, which may be an optical intensity modulator and/or an interferometer such as a Mach-Zehnder interferometer.

While the disclosed optoelectronic modulator has been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An optoelectronic modulator for modulating an optical signal in response to an electromagnetic signal, the optoelectronic modulator comprising:

a waveguide for receiving the optical signal, wherein the waveguide has an associated width and includes:

an optical index of refraction with respect to the optical signal; and a microwave index of refraction with respect to the electromagnetic signal;

wherein the waveguide is fabricated with the microwave index of refraction substantially matching the optical index of refraction for velocity-matching the optical signal and the electromagnetic signal through the waveguide and for providing a frequency bandwidth in excess of about 40 GHz.

2. The optoelectronic modulator of claim 1 further comprising:

a substrate; and a lower cladding layer disposed upon the substrate;

wherein the waveguide further includes:

an upper cladding layer; and a quantum well region positioned between the upper and lower cladding layers.

3. The optoelectronic modulator of claim 2 wherein the quantum well region includes a plurality of Barrier Reservoir and Quantum Well Electron Transfer (BRAQWET) structures.

4. The optoelectronic modulator of claim 2 wherein the electromagnetic signal is applied between the upper cladding layer and the substrate to modulate the optical signals.

5. The optoelectronic modulator of claim 2 wherein the substrate has an n-type doped composition.

6. The optoelectronic modulator of claim 2 wherein the substrate includes a semi-insulating composition.

7. The optoelectronic modulator of claim 1 wherein the waveguide is configured as a substantially straight rib having an associated width, core thickness, and waveguide-electrode separation which determine the matching of optical and microwave indices of refraction.

8. The optoelectronic modulator of claim 7 further comprising a doped substrate;
wherein the optical index of refraction is about 3.3;
the associated width is within the range of 2.5 µm and 3.9 µm;
the waveguide-electrode separation is within the range of 7 µm and 15 µm; and
the core thickness is within the range of 0.5 µm and 0.8 µm, to determine the microwave index of refraction to be about 4.0.

9. The optoelectronic modulator of claim 1 further comprising a semi-insulating substrate;
wherein the optical index of refraction is about 3.3, and the microwave index of refraction is about 3.3.

10. An optoelectronic modulator for modulating an optical signal in response to an electromagnetic signal, the optoelectronic modulator comprising:
a substrate;
a contact pad for receiving the electromagnetic signal; and
a waveguide operatively connected to the substrate and to the contact pad, and including a rib for receiving the optical signal and having:
an optical index of refraction with respect to the optical signal; and
a microwave index of refraction with respect to the electromagnetic signal;
wherein the microwave index of refraction substantially matches the optical index of refraction for velocity-matching the optical signal and the electromagnetic signal through the waveguide for modulating the optical signal, and for providing a bandwidth associated with the optoelectronic modulator of about 40 GHz at about 3 dB.

11. The optoelectronic modulator of claim 10 wherein the waveguide includes a quantum well region.

12. The optoelectronic modulator of claim 11 wherein the quantum well region includes a plurality of Barrier Reservoir and Quantum Well Electron Transfer (BRAQWET) structures.

13. The optoelectronic modulator of claim 11 wherein the quantum well region is disposed between the substrate and the contact pad for receiving the electromagnetic signal applied between the substrate and the contact pad to modulate the optical signals.

14. The optoelectronic modulator of claim 10 wherein the substrate has an n-type InP:Si composition.

15. The optoelectronic modulator of claim 10 wherein the substrate is an n-type doped substrate and the waveguide is configured as a rib having an associated width, core thickness, and waveguide-electrode separation which determine the matching of optical and microwave indices of refraction.

16. The optoelectronic modulator of claim 15 wherein the optical index of refraction is about 3.3; and the associated width is within the range of 2.5 µm and 3.9 µm to determine the microwave index of refraction to be about 4.0.

17. The optoelectronic modulator of claim 10 wherein the substrate is a semi-insulating substrate; and
the waveguide is configured such that the optical index of refraction is about 3.3, and the microwave index of refraction to be about 4.0.

18. An optoelectronic modulator for modulating an optical signal in response to an electromagnetic signal, the optoelectronic modulator comprising:
a substrate having an n-type doped composition;
a lower cladding layer positioned upon the substrate; and
a waveguide having a rib with an associated width in a coplanar-microstrip configuration for receiving the optical signal and operatively connected to the substrate through the lower cladding layer, having:
a quantum well region;
an optical index of refraction with respect to the optical signal; and
a microwave index of refraction with respect to the electromagnetic signal;
wherein the microwave index of refraction substantially matches the optical index of refraction for velocity-matching the optical signal and the electromagnetic signal through the waveguide, for modulating the optical signal, and for providing a bandwidth associated with the optoelectronic modulator of about 40 GHz at about 3 dB.

19. The optoelectronic modulator of claim 18 wherein the width is about 2.5 µm for substantially matching the optical and microwave indices of refraction.

20. The optoelectronic modulator of claim 18 wherein the rib of the waveguide is substantially straight and positioned upon the lower cladding layer, with the rib including:
the quantum well region; and
an upper cladding layer for receiving the electromagnetic signal from an electrode.

21. The optoelectronic modulator of claim 20 wherein the electromagnetic signal is applied between the upper cladding layer and the substrate to modulate the optical signals.

22. The optoelectronic modulator of claim 18 wherein quantum well region includes a plurality of Barrier Reservoir and Quantum Well Electron Transfer (BRAQWET) periods, with each period including:
an InGaAlAs reservoir being Si-doped and having a bandgap of about 1.06 eV bandgap;
an undoped InGaAlAs spacer;
an InGaAs quantum well; and
an InAlAs barrier.

23. The optoelectronic modulator of claim 2 wherein the quantum well region includes a heterostructure.

24. The optoelectronic modulator of claim 23 wherein the quantum well region includes alternating layers of InGaAsP quantum wells as the heterostructure.

25. The optoelectronic modulator of claim 1 wherein the waveguide is configured as at least a portion of a second waveguide structure having the matching of optical and microwave indices of refraction.

26. The optoelectronic modulator of claim 25 wherein the second waveguide structure is a directional coupler.

27. The optoelectronic modulator of claim 25 wherein the second waveguide structure is a Y-branch switch.

28. The optoelectronic modulator of claim 25 wherein the second waveguide structure is a modulator structure.

29. The optoelectronic modulator of claim 28 wherein the second waveguide structure is an optical intensity modulator.

30. The optoelectronic modulator of claim 28 wherein the second waveguide structure is an interferometer structure.

31. An optoelectronic modulator for modulating an optical signal in response to an electromagnetic signal, the optoelectronic modulator comprising:

a waveguide for receiving the optical signal, wherein the waveguide has an associated width and includes:
an optical index of refraction of about 3.3 with respect to the optical signal; and
a microwave index of refraction with respect to the electromagnetic signal;
wherein the waveguide is fabricated with the microwave index of refraction substantially matching the optical index of refraction for velocity-matching the optical signal and the electromagnetic signal through the waveguide, wherein the waveguide is configured as a substantially straight rib having an associated width within the range of 2.5 µm and 3.9 µm, a core thickness within the range of 0.5 µm and 0.8 µm, and a waveguide-electrode separation within the range of 7 µm and 15 µm which determine the matching of optical and microwave indices of refraction with the microwave index of refraction being about 4.0.

* * * * *